Sept. 25, 1956     G. E. ARMINGTON     2,764,203
TIRE TRACK WITH DIFFERENTIAL ACTION Filed Dec. 4, 1952     3 Sheets-Sheet 2

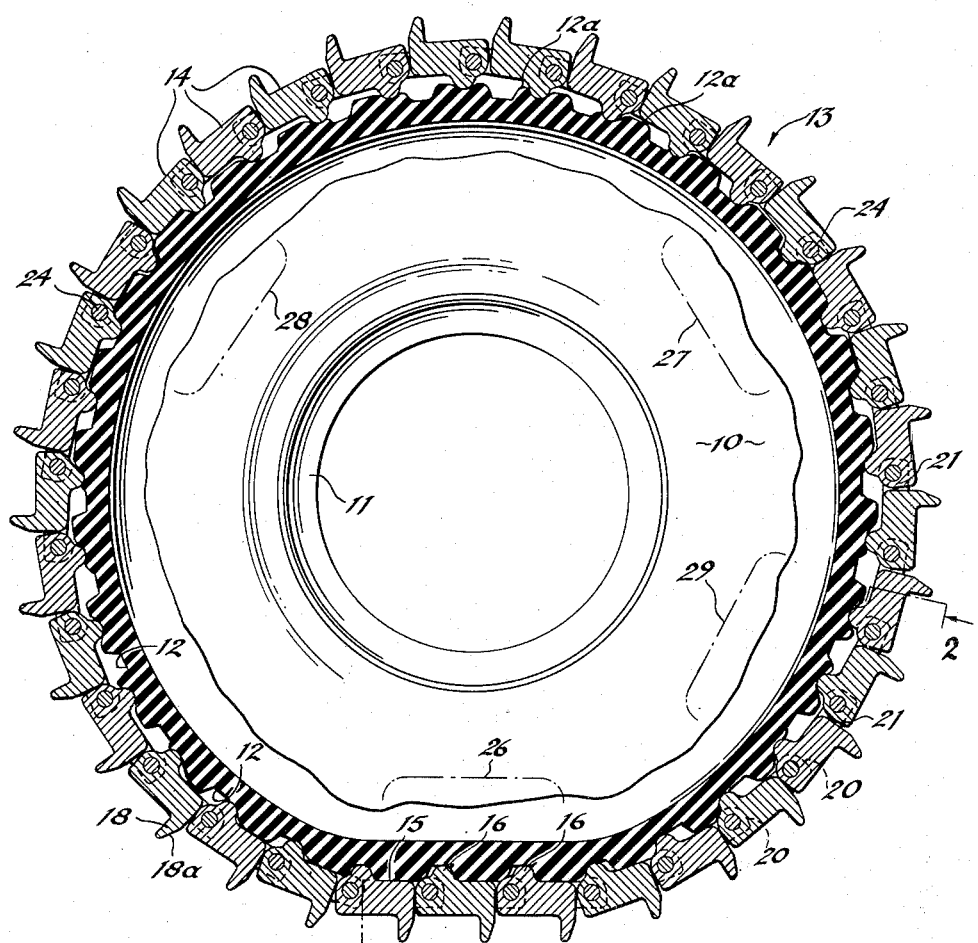
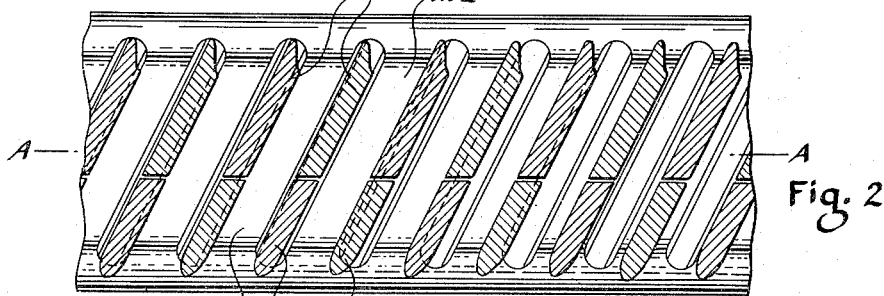

INVENTOR.
George E. Armington
BY
Hyde, Meyer, Baldwin & Doran
ATTORNEYS

Sept. 25, 1956   G. E. ARMINGTON   2,764,203
TIRE TRACK WITH DIFFERENTIAL ACTION
Filed Dec. 4, 1952   3 Sheets-Sheet 3

INVENTOR.
George E. Armington
BY
Hyde, Meyer, Baldwin & Doran
ATTORNEYS

United States Patent Office 2,764,203
Patented Sept. 25, 1956

2,764,203

TIRE TRACK WITH DIFFERENTIAL ACTION

George E. Armington, South Euclid, Ohio, assignor, by mesne assignments, to General Motors Corporation, Detroit, Mich., a corporation of Delaware Application December 4, 1952, Serial No. 324,073

7 Claims. (Cl. 152—182)

This invention relates to improvements in a combination of a large pneumatic tire and an endless track completely surrounding and partially embracing the tire, said track comprising a plurality of rigid shoes with articulating connections between adjacent shoes, the shoes having ridges which engage grooves in the tire.

One of the objects of the present invention is to provide a novel arrangement whereby a large size pneumatic tire having a normal working pressure not substantially over 25 pounds per square inch is provided with an armored protection which at the same time increases the ground gripping properties of the combination tire and track for off-the-highway operation of the vehicle.

Another object of the present invention is to provide a novel combination between a track having a plurality of shoes with articulating connections between them, and wherein ridges on the shoes engage in grooves in the tire tread so as to hold the track tightly on the tire, to prevent slippage between the tire and track, and to gear together the tire, the track and the ground.

A further object of the present invention is to provide a novel track shoe capable of carrying out the above-described functions.

Other objects and advantages of my invention will be apparent from the accompanying drawings and description and the essential features thereof will be set forth in the appended claims.

In the drawings,

Fig. 1 is a side elevational view showing a pneumatic tire with my improved endless track in position on the tire, portions being broken away in central section, and with the entire combination under load;

Fig. 2 is a fragmental sectional view taken along the line 2—2 of Fig. 1 and looking upwardly at the ground engaging portion of the tire and inwardly at an adjacent non-ground-engaging portion of the tire;

Fig. 6 is a transverse sectional view of a shoe taken along the line 6—6 of Fig. 4; while

Figure 3:
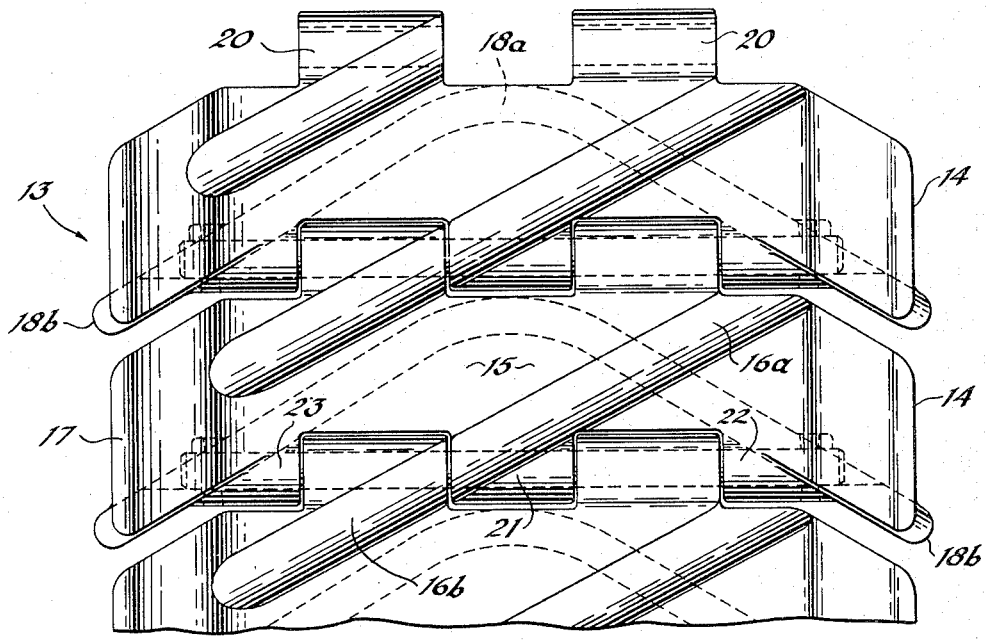
Fig. 3 is a top plan view enlarged of a portion of the track laid out flat, as for instance, the ground engaging portion of the track in Fig. 1.

Off-the-highway vehicles use large pneumatic tires, both for the purpose of carrying the load, and for the purpose of floating the load on a large supporting area which is especially necessary where ground conditions are poor for supporting loads, such as in mud and sand. With the increasing use of greater power for driving such vehicles, it is necessary to increase the tractive effect of such tires in order to handle the loads involved. The present invention applies an endless track of metal shoes surrounding the entire tread of the tire and extending slightly around the side walls of the tire, so as to give an armored protective effect to the pneumatic tire, and at the same time increasing the tractive effect when such tires are driven in order to propel the vehicle. It is important that an endless track of this type be firmly engaged with the tire at all times. The present invention accomplishes this by providing ridges on the track shoes which engage within grooves in the tire tread, and the parts are so designed that the track is always tight upon the tire and the ridges of the track shoes are always engaged in the grooves in the tire tread.

The tire illustrated herein is an 18.00x25 tire which means that its overall diameter is approximately five feet. My invention is intended for successful operation with such a tire utilizing an internal pressure of 25 pounds per square inch or less.

The tire 10, illustrated herein, is of this character. It will be understood that such tires usually have inner tubes but for clarity the inner tube has been omitted from Fig. 1. The tire is shown mounted on a conventional rim 11.

For use in the present combination, the tire tread is provided with a plurality of spaced parallel grooves 12 extending crosswise of the tire tread. As shown in Fig. 2, the grooves of the present embodiment extend at an angle of about 60 degrees to the line A—A extending around the periphery of the tire centrally of its tread. It should be understood, however, that by "crosswise" in the specification and claims I include other angles, including grooves which might extend at right angles to the line A—A.

The track 13 is composed of a plurality of shoes 14, preferably of iron or steel, and having articulating or hinged connections between adjacent shoes. As clearly seen in Figs. 3 to 7 inclusive, each of these shoes 14 is longer crosswise of the tire than its extent circumferentially of the tire. Each shoe has a generally flat tread-engaging inner surface 15 carrying the tire groove engaging ridges 16a and 16b. At each end of the central portion 15, the surfaces of the shoe toward the tire incline upwardly and away from the central portion of the shoe as indicated at 17. These end portions 17 partially embrace the side walls of the tire when the track is in position assembled on the tire as in Fig. 1. It will be clear from Figs. 4, 5 and 6 that the portions 17 of each shoe are of metal of comparatively thin section but of such a thickness to give sufficient strength to the shoe without being very heavy. The central portion 15 is thicker because it supports the tire engaging ridges on the one side and the ground engaging grouser on its other side. This grouser, shown at 18, might be of various forms, but it is here shown as V-shape having the apex of the V at 18a located centrally of one side of the shoe and the ends of the legs of the V at 18b terminating at the outer ends of the other face of the shoe. The portions 18b of the grouser are connected by walls 19 which extend upwardly and join integrally with the wings 17 on that side of the shoe.

Figure 4:
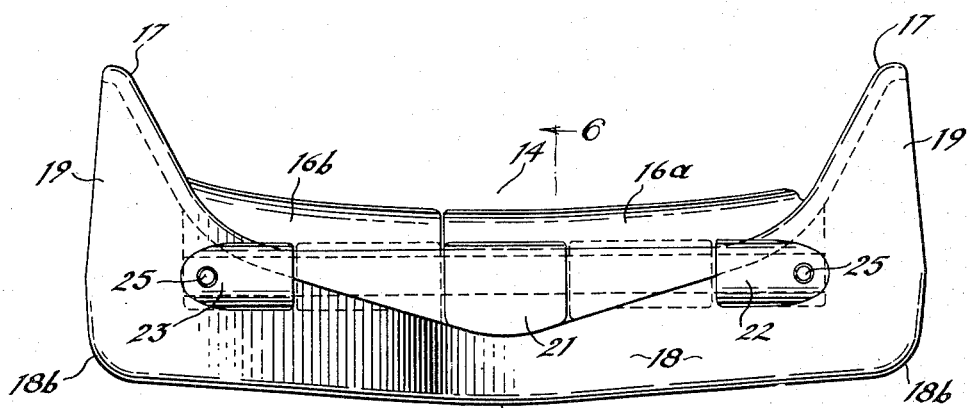
Fig. 4 is a side elevational view of one of the shoes of Fig. 3.
Figure 5:
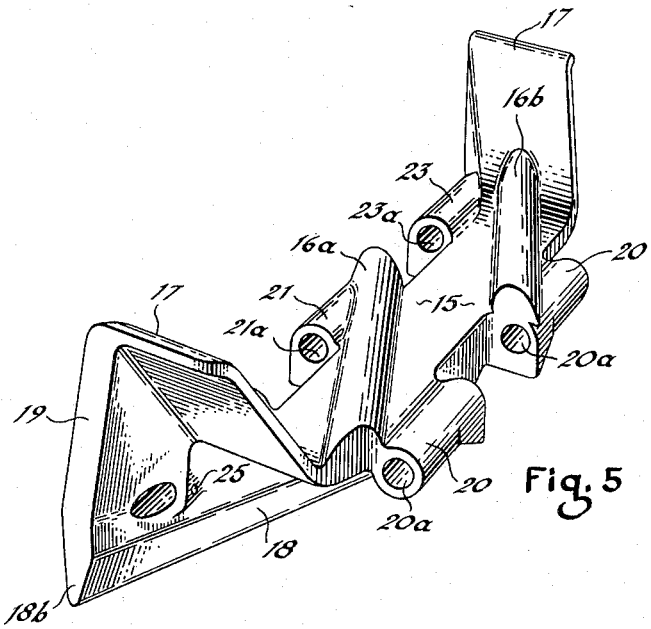
Fig. 5 is a perspective view of one of the shoes of Fig. 3.

Means is provided for hingedly connecting adjacent shoes together. For this purpose, two hinge lugs 20 are provided in spaced apart relationship on that side of the shoe where the apex 18a of the grouser is found. Three hinge lugs 21, 22 and 23 are arranged along the opposite side of the shoe and so spaced apart that the lugs 20 of one shoe fit between the lugs 21, 22 and 23 of the adjacent shoe in a rather snug relationship as seen in Figs. 3 and 4. All of these lugs have through openings for the purpose of receiving a hinge pin 24. Each of these openings is given the same number as its hinge lug with the suffix a. It will be noted that the hinge lugs 22 and 23 merge into the wall 19 previously mentioned. Openings are provided at 25 through the hinge lugs 22 and 23 for the purpose of receiving pins to hold the hinge pins in place.

It will be noted that the grouser portions adjacent 18b cross and merge with the hinge lugs 22 and 23 which adds to the strength of the shoe and aids in keeping the shoe clean of dirt.

The tire engaging ridges in the shoes might be arranged in various ways but I have provided a novel arrangement as shown at 16a and 16b wherein each of the shoes has two parallel straight ridges respectively in left-hand and right-hand positions, and the right-hand ridge of one shoe is in alignment as a rectilinear continuation of the left-hand ridge of an adjacent shoe when the track is assembled as shown in Fig. 3.

Figure 7:
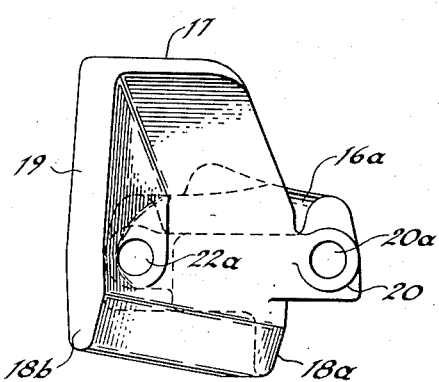
Fig. 7 is an end elevational view of a shoe taken from the right-hand end of Fig. 4.
Figure 6:
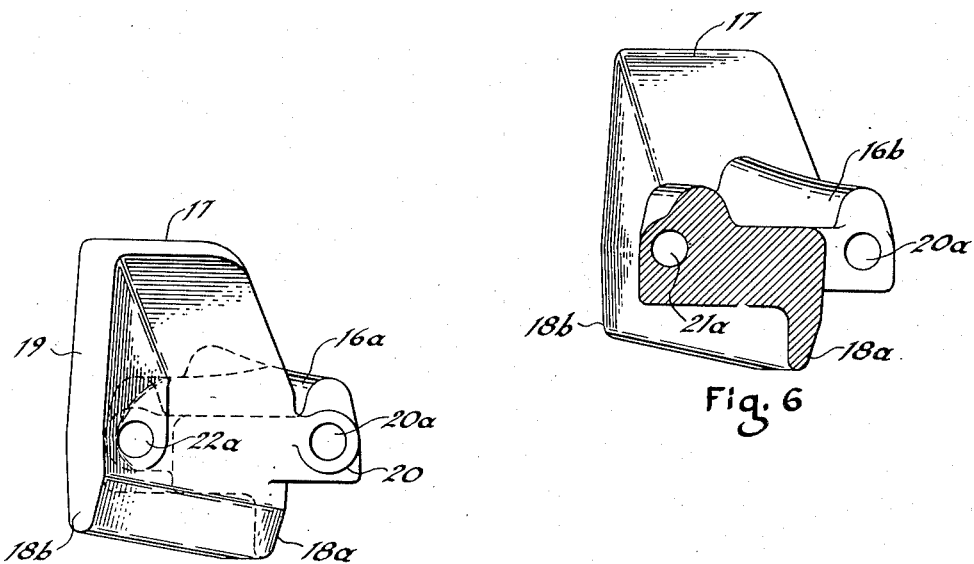

As clearly seen in Figs. 4, 6 and 7, the ridge portions 16a and 16b are preferably of slightly greater extent above the surface 15 toward the outer ends of the shoe as compared with the height of these ridges toward the center of the shoe. This is so that the ridges of the track shoe will follow the contour of the grooves 12 in the tire tread around the natural curve of the tire.

In operation, the track 13 is assembled on the tire 10 with the tire in deflated condition. Some little effort must be exerted to assemble the track properly on the tire because the spacing between the ridges 16 of adjacent shoes, as shown in Fig. 1, is approximately equal to the spacing between the groves 12 of the tire tread when the same is flattened against the ground as shown in Fig. 1. Therefore the ridges 16 of the track (16a+16b) fit into the grooves only at certain zones 26, 27 and 28. This is because there are more shoes and ridges 16, one to each shoe, than there are grooves 12 in the tread. In the present case, 33 shoes and ridges 16; 30 graaves 12. It is obvious that the spacing of the grooves 12 at the ground engaging portion of the tire, under load, is slightly less than the spacing of these same grooves around the non-ground engaging portion of the tire. Therefore, the pitch of the ridges 16 which fits the grooves 12 in zone 26 is too closely spaced for the grooves in the non-ground-engaging portions of the tire. Looking at Figs. 1 and 2, the ridges fit perfectly in the grooves at zone 26. A little later at zone 29 the ridges are riding up on the rubber lugs 12a between the grooves 12. A little later, at zone 27, the ridges 16 again coincide with groves 12; and again later at zone 28. In other words, the track 14 slowly creeps around the tire but always there is a perfect fit between ridges 16 and grooves 12 where the tire drivingly engages the ground. The rubber lugs or portions 12a of the tire tread, between the grooves 12, and the side walls of the tire deform to compensate for the variation in pitch of the track shoe ridges as compared with the pitch of the grooves in the tire.

It will be understood that the track is assembled upon the tire so that the apex 18a of each grouser is extended in the direction of rotation of the tire when the vehicle is traveling in the forward direction. This direction of travel is indicated by the arrow in Fig. 1.

The grooves 12 in the tire become narrower under ground contact. The ridge portions 16a and 16b of the track shoes are made narrower than the grooves 12 as molded in the tire casing. This gives the rubber of the tire space in which to flow when the rubber is compressed as the tire flattens.

What I claim is:

1. In combination, a pneumatic tire having, under no load, evenly spaced grooves extending crosswise of its tread, an endless track completely surrounding and engaging the circumference of said tire, said track comprising a plurality of shoes and articulating connections between adjacent shoes, said tire being of a construction and having a degree of inflation such that it flattens at that portion in engagement with the ground under load, whereby said evenly spaced grooves have a reduced even spacing along said ground-engaging portion, said shoes having evenly spaced ridges at said reduced even spacing, said ridges fitting into said grooves at said ground-engaging portion, there being a greater number of ridges than grooves, said ridges fitting into said grooves at alternate zones around the circumference of said tire.

2. In combination, a pneumatic tire having, under no load, evenly spaced grooves extending crosswise of its tread, said tire having a normal working pressure not substantially over twenty-five pounds per square inch, an endless track completely surrounding and engaging the circumference of said tire, said track comprising a plurality of shoes and articulating connections between adjacent shoes, said tire being of a construction and having a degree of inflation such that it flattens at that portion in engagement with the ground under load, whereby said evenly spaced grooves have a reduced even spacing along said ground-engaging portion, said shoes having evenly spaced ridges at said reduced even spacing, said ridges fitting into said grooves at said ground-engaging portion and at alternate zones around said tire, and there being a greater number of ridges than grooves.

3. The combination of claim 1 wherein said track snugly engages said tire around its entire circumference.

4. A track shoe wider across the track than its length along the track, said shoe having a tread portion on one face and a single grouser integral with said shoe and extending outwardly from a face of said shoe opposite said one face, said shoe having a pair of spaced tire-engaging ridges extending from said tread portion, the lateral outer end portions of said ridges extending outwardly from said tread portion to a greater extent than the center portions of said ridges and said shoe having parallel hinge connections along its longer sides.

5. The combination of claim 1, wherein the lateral outer end portions of said ridges extend radially inward farther than the center portion of said ridge, so as to follow the contour of the engaging tire tread.

6. The combination of claim 1 wherein each of said shoes has a grouser extending substantially entirely across its ground-engaging face in substantially a V-shape.

7. A track shoe wider across the track than its length along the track, for use in an endless track and having substantially flat inner and outer faces, said shoe having a pair of spaced tire-engaging ridges extending beyond its inner face, and said shoe having a single grouser extending beyond and substantially across its outer face.

References Cited in the file of this patent

UNITED STATES PATENTS

| | | |
|---|---|---|
| 1,038,235 | Toso | Sept. 10, 1912 |
| 1,307,036 | Bretscher | June 17, 1919 |
| 2,046,299 | Armington | June 30, 1936 |
| 2,209,201 | Hill | July 23, 1940 |

FOREIGN PATENTS

| | | |
|---|---|---|
| 269,378 | Switzerland | Oct. 16, 1950 |